United States Patent
Neiger et al.

(10) Patent No.: US 9,563,455 B2
(45) Date of Patent: Feb. 7, 2017

(54) VIRTUALIZATION EXCEPTIONS

(71) Applicant: Intel Corporation, Santa Clara, CA (US)

(72) Inventors: Gilbert Neiger, Portland, OR (US); Mayank Bomb, Hillsboro, OR (US); Manohar Castelino, Santa Clara, CA (US); Robert Chappell, Portland, OR (US); David Durham, Beaverton, OR (US); Barry Huntley, Hillsboro, OR (US); Anton Ivanov, Beaverton, OR (US); Madhavan Parthasarathy, Portland, OR (US); Scott Rodgers, Hillsboro, OR (US); Ravi Sahita, Beaverton, OR (US); Vedvyas Shanbhogue, Austin, TX (US)

(73) Assignee: INTEL CORPORATION, Santa Clara, CA (US)

(*) Notice: Subject to any disclaimer, the term of this patent is extended or adjusted under 35 U.S.C. 154(b) by 105 days.

(21) Appl. No.: 14/064,759

(22) Filed: Oct. 28, 2013

(65) Prior Publication Data
US 2015/0121366 A1 Apr. 30, 2015

(51) Int. Cl.
G06F 9/455 (2006.01)
G06F 11/07 (2006.01)

(52) U.S. Cl.
CPC ......... *G06F 9/4555* (2013.01); *G06F 9/45533* (2013.01); *G06F 11/07* (2013.01)

(58) Field of Classification Search
None
See application file for complete search history.

(56) References Cited

U.S. PATENT DOCUMENTS

| | | | | |
|---|---|---|---|---|
| 6,092,147 A * | 7/2000 | Levy et al. | | 711/6 |
| 7,555,592 B1 * | 6/2009 | Koryakin et al. | | 711/6 |
| 2005/0080965 A1 * | 4/2005 | Bennett et al. | | 710/200 |
| 2009/0327575 A1 * | 12/2009 | Durham | | G06F 12/145 |
| | | | | 711/6 |
| 2013/0007325 A1 * | 1/2013 | Sahita et al. | | 710/267 |
| 2013/0117743 A1 | 5/2013 | Neiger et al. | | |
| 2013/0174147 A1 | 7/2013 | Sahita et al. | | |

OTHER PUBLICATIONS

Tan et al. TinyChecker: Transparent protection of VMs against hypervisor failures with nested virtualization. [online] (Jan. 2012). IEEE., pp. 1-7. Retrieved From the Internet <http://www.researchgate.net/profile/Yubin_Xia/publication/261502152_TinyChecker_Transparent_protection_of_VMs_against_hypervisor_failures_with_nested_virtualization/1>.*

(Continued)

*Primary Examiner* — Emerson Puente
*Assistant Examiner* — Jonathan R Labud
(74) *Attorney, Agent, or Firm* — Nicholson De Vos Webster & Elliott LLP

(57) ABSTRACT

Embodiments of an invention for virtualization exceptions are disclosed. In one embodiment, a processor includes instruction hardware, control logic, and execution hardware. The instruction hardware is to receive a plurality of instructions, including an instruction to enter a virtual machine. The control logic is to determine, in response to a privileged event occurring within the virtual machine, whether to generate a virtualization exception. The execution hardware is to generate a virtualization exception in response to the control logic determining to generate a virtualization exception.

6 Claims, 2 Drawing Sheets

(56) References Cited

OTHER PUBLICATIONS

Uhlig et al. Intel Virtualization Technology. [online] (2005). IEEE., pp. 48-56. Retrieved From the Internet <http://www.acis.ufl.edu/~pbhat/Papers/2005-IntelVirtualizationTechnology-Uhlig.pdf>.*
Belay et al. Dune: Safe User-level Access to Privileged CPU Features. [online] (Oct. 10, 2012). USENIX., pp. 335-348. Retrieved From the Internet <https://www.usenix.org/system/files/conference/osdi12/osdi12-final-117.pdf>.*

\* cited by examiner

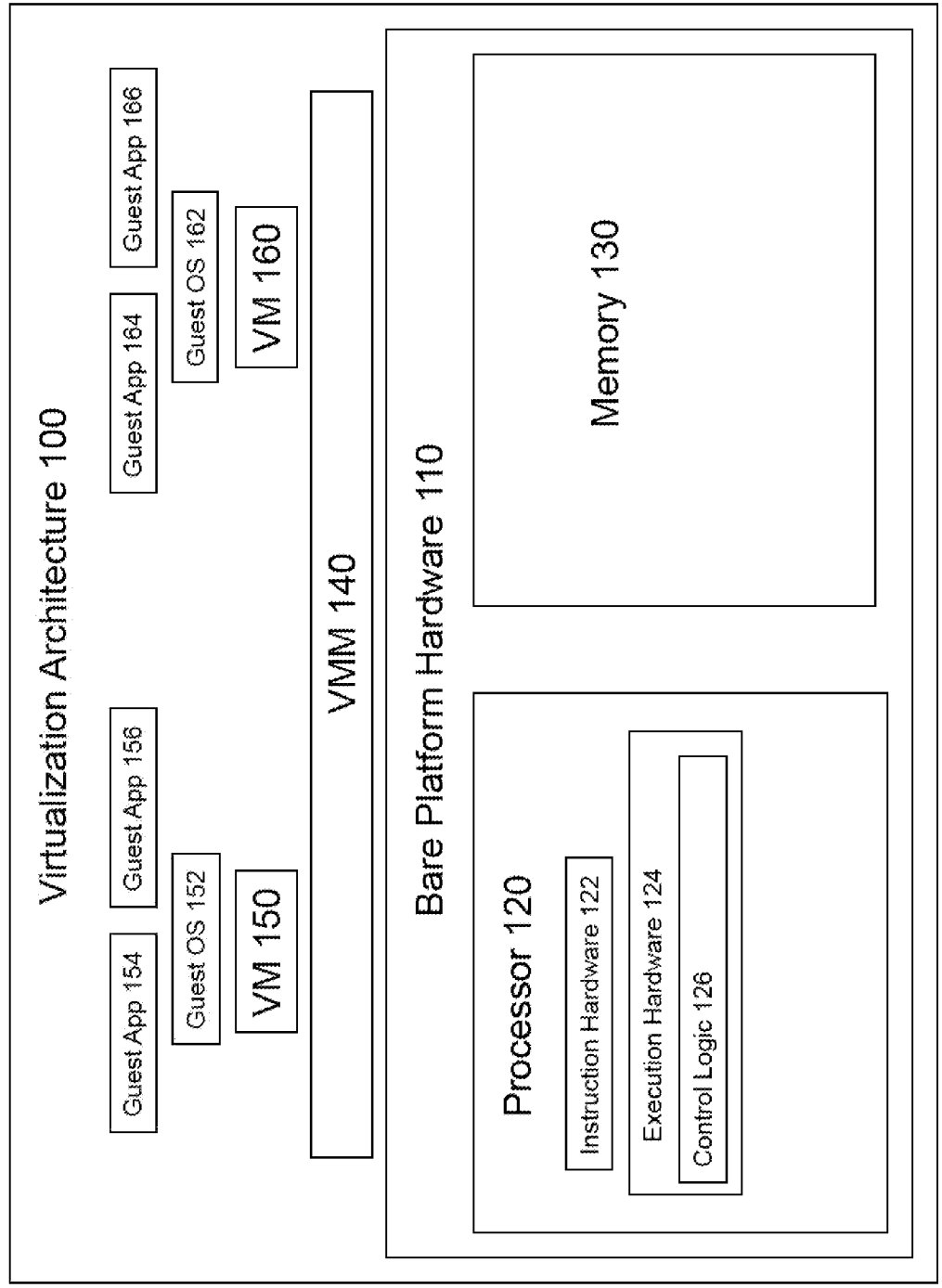

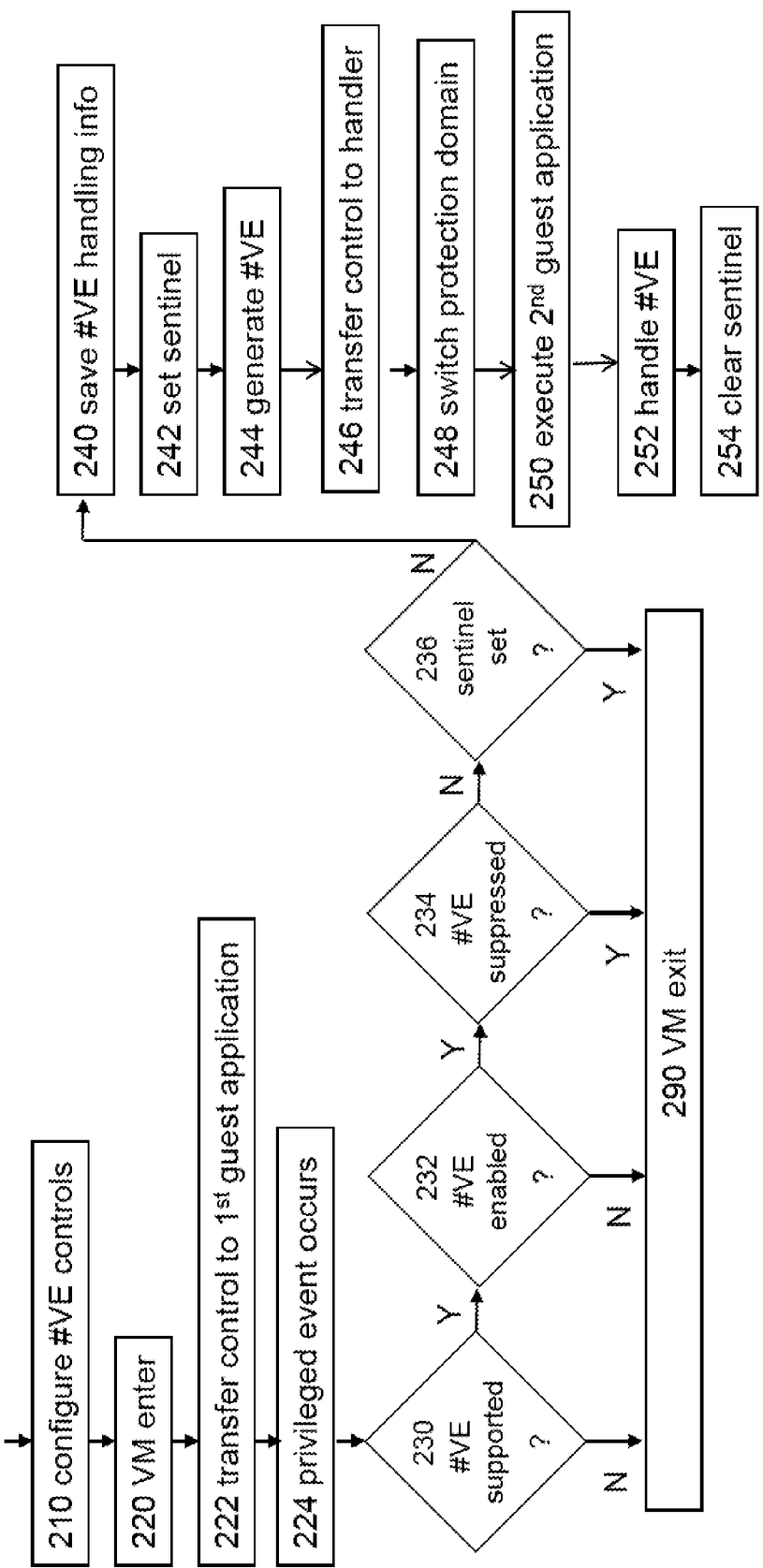

VIRTUALIZATION EXCEPTIONS

BACKGROUND

1. Field

The present disclosure pertains to the field of information processing, and more particularly, to the field of virtualizing resources in information processing systems.

2. Description of Related Art

Generally, the concept of virtualization of resources in information processing systems allows multiple instances of one or more operating systems (each, an "OS") to run on a single information processing system, even though each OS is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtual environment").

A processor in an information processing system may support virtualization, for example, by operating in two modes—a "root" mode in which software runs directly on the hardware, outside of any virtualization environment, and a "non-root" mode in which software runs at its intended privilege level, but within a virtual environment hosted by a VMM running in root mode. In the virtual environment, certain events, operations, and situations, such as external interrupts or attempts to access privileged registers or resources, may be intercepted, i.e., cause the processor to exit the virtual environment so that the VMM may operate, for example, to implement virtualization policies (a "VM exit"). The processor may support instructions for establishing, entering, exiting, and maintaining a virtual environment, and may include register bits or other structures that indicate or control virtualization capabilities of the processor.

BRIEF DESCRIPTION OF THE FIGURES

The present invention is illustrated by way of example and not limitation in the accompanying figures.

FIG. 1 illustrates a virtualization architecture in which an embodiment of the present invention may provide for virtualization exceptions.

FIG. 2 illustrates a method for using virtualization exceptions according to an embodiment of the present invention.

DETAILED DESCRIPTION

Embodiments of processors, methods, and systems for virtualization exceptions are described below. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and the like have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in the specification and claims, unless otherwise specified, the use of the ordinal adjectives "first," "second," "third," etc. to describe an element merely indicates that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type of storage location, or the content(s) thereof, in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

The performance of a virtual environment may be improved by reducing the frequency of VM exits. Embodiments of the invention may be used to reduce the frequency of VM exits.

FIG. 1 illustrates virtualization architecture 100, in which an embodiment of the present invention may operate. In FIG. 1, bare platform hardware 110 may be any data processing apparatus capable of executing any OS, VMM, or other software. For example, bare platform hardware 110 may be that of a personal computer, mainframe computer, portable computer, handheld device, smartphone, set-top box, server, or any other computing system. Bare platform hardware 110 includes processor 120 and memory 130.

Processor 120 may represent any type of processor, including a general purpose microprocessor, such as a processor in the Core® Processor Family, the Atom® Processor Family, or other processor family from Intel Corporation, or another processor from another company, or a digital signal processor or microcontroller. Although FIG. 1 shows only one such processor 120, bare platform hardware 110 may include any number of processors, including any number of multicore processors, each with any number of execution cores and any number of multithreaded processors, each with any number of threads, in any combination.

Memory 130 may be static or dynamic random access memory, semiconductor-based read only or flash memory, magnetic or optical disk memory, any other type of medium readable by processor 120, or any combination of such mediums.

Processor 120, memory 130, and any other components or devices of bare platform hardware 110 may be connected, coupled, or otherwise in communication with each other according to any known approach, such as directly or indirectly through one or more buses, point-to-point, or other wired or wireless interfaces or connections. Any components or other portions of bare platform hardware 110, whether shown in FIG. 1 or not shown in FIG. 1, may be integrated or otherwise included on or in a single chip (a "system-on-a-chip" or "SOC"), die, substrate, or package.

Returning to processor 120, shown as included are instruction hardware 122, execution hardware 124, and control logic 126. Processor 120 may also include any other hardware and/or logic not shown.

Instruction hardware 122 may include any circuitry, logic, structures, and/or other hardware to fetch, receive, decode, interpret, and/or schedule instructions to be executed by processor 120. Processor 110 may operate according to an instruction set architecture that includes any number of instructions to support virtualization. Embodiments of the present invention may be practiced with a processor having an instruction set architecture of a processor family from Intel® Corporation, using instructions that may be part of a set of virtualization extensions to any existing instruction set architecture, or according to another approach. Support for these instructions may be implemented in processor 120 using any combination of circuitry and/or logic embedded in hardware, microcode, firmware, and/or other structures.

Execution hardware 124 may include any circuitry, logic, structures, and/or other hardware, such as arithmetic units, logic units, floating point units, shifters, etc., to process data and execute instructions, micro-instructions, and/or micro-operations. Execution hardware 124 may include and/or be controlled by control logic 126.

Control logic 126 may include any microcode, firmware, circuitry, structures, programmable logic, hard-coded logic, and/or other logic and hardware to control the operation of execution unit 124 and other units of processor 120. In other embodiments, control logic 126 may be implemented in any form of hardware, software, or firmware, such as a processor abstraction layer, within a processor or within any component accessible or medium readable by a processor, such as memory 130. Control logic 126 may cause processor 120 to perform or participate in the performance method embodiments of the present invention, such as the method embodiment illustrated in FIG. 2, for example, by causing execution unit 124 to include the execution of one or more micro-instructions or micro-operations to support virtualization in its response to virtualization or other instructions received from instruction unit 122 or events occurring on bare platform hardware 110.

In addition to bare platform hardware 110, FIG. 1 illustrates VMM 140, VMs 150 and 160, OSs 152 and 162, and applications 154, 156, 164, and 166. A VM may be referred to as a "guest machine" or "guest" (e.g., VMs 150 and 160), an OS that runs on a VM may be referred to as a "guest OS" (e.g., OSs 152 and 162), and an application that runs on a VM may be referred to as a "guest application" (e.g., applications 154, 156, 164, and 166). VMM 140 may represent any VMM, hypervisor, or other software or firmware installed on or accessible to bare platform hardware 110 to present VMs, i.e., abstractions of bare platform hardware 110, to guest OSs and guest applications, or to otherwise create VMs, manage VMs, and implement virtualization policies. A platform, system, or machine (including a guest machine in the case of nested virtualization) may be referred to as a "host machine" or "host" (e.g., bare platform hardware 110).

Each guest OS and guest application expects to access resources, such as processor and platform registers, memory, and input/output devices, according to the architecture of the virtual processor and the platform presented in the VM, where the expected resources may correspond to any combination of actual physical resources of bare platform hardware 110, virtual resources provided or supported by actual physical resources of bare platform hardware 110 (e.g., by sharing), and/or virtual resources provided by software emulation of physical resources. Therefore, any single embodiment of the present invention may include any number of guest OSs and guest applications written for any number of different hardware platforms. Although FIG. 1 shows two VMs, 150 and 160, with guest OS 152 and guest applications 154 and 156 installed on VM 150 and guest OS 162 and guest applications 164 and 166 installed on VM 160, any number of VMs may be created and any number of guest applications may run on each VM within the scope of the present invention.

A resource that can be accessed by a guest OS (and sometimes by a guest application) may either be classified as a "privileged" or a "non-privileged" resource. For a privileged resource, VM 140 facilitates the functionality desired by the guest OS or guest application while retaining ultimate control over the resource. Non-privileged resources do not need to be controlled by VMM 140 and may be accessed directly by a guest OS (and sometimes by a guest application).

Furthermore, each guest OS expects to handle various events such as exceptions (e.g., page faults, and general protection faults), interrupts (e.g., hardware interrupts and software interrupts), and platform events (e.g., initialization and system management interrupts). These exceptions, interrupts, and platform events are referred to collectively and individually as "events" herein. Some of these events are "privileged" because special handling of these events may be desired to ensure proper operation of VMs 150 and 160, protection of VMM 140 from guest OSs and guest applications, and protection of guest OSs and guest applications from each other.

At any given time, processor 120 may be executing instructions from VMM 140 or any guest OS or guest application, thus VIM 140 or the guest OS or guest application may be running on, or in control of, processor 120. When a privileged event occurs or a guest OS or guest application attempts to access a privileged resource, a VM exit may occur, transferring control from the guest OS or guest application to VMM 140. After handling the event or emulating or facilitating the access to the resource appropriately, VMM 140 may return control to a guest OS or guest application. The transfer of control from VMM 140 to a guest OS or guest application (including an initial transfer to a guest OS or guest application on a newly created VM) is referred to as a "VM entry" herein. Instructions that are executed to transfer control to a VM may be referred to generically as "VM enter" instructions, and for example, may include a VMLAUCH and a VMRESUME instruction in the instruction set architecture of a processor in the Core® Processor Family.

Processor 120 may control the operation of VMs 150 and 160 according to data stored in one or more virtual machine control structures (each, a "VMCS"). A VMCS is a data structure that may contain state of one or more guests, state of a host, execution control information indicating how VMM 140 is to control operation of a guest or guests, execution control information indicating how VM exits and VM entries are to operate, information regarding VM exits and VM entries, any other such information. Processor 120 reads information from the VMCS to determine the execution environment of a VM and constrain its behavior. Embodiments may use one VMCS per VM, or any other arrangement may be used in other embodiments. Each VMCS may be stored, in whole or in part, in memory 130, and/or elsewhere, such as being copied to a cache memory of a processor.

Each VMCS may include any number of indicators or other controls to protect any number of different resources. For example, any size area of memory may be protected at any granularity (e.g., a 4 KB page) using a set of extended page tables ("EPT"), which provide for each VM, if desired, to have its own virtual memory space and, from the perspective of a guest OS, its own physical memory space. The addresses that a guest application uses to access its linear or virtual memory may be translated, using page tables configured by a guest OS, to addresses in the memory space that appears (through the virtualization supported by the processor and the VMM) as system memory to the guest OS (each, a "guest physical address" or "GPA"). The GPAs may be translated to addresses (each, a "host physical address" or "HPA") in actual system memory (e.g., memory 130), through the EPTs (which have been configured by the VMM prior to a VM entry) without causing a VM exit. EPT entries may include permissions (e.g., read, write, and/or execute permissions) and/or other indicators to enforce access restrictions. Therefore, EPTs may be used to create protected domains in system memory. An attempt to perform an unpermitted access to a page or other data structure in a protected domain is called an EPT violation and may cause a VM exit.

Embodiments of the present invention also provide for an EPT violation to cause a change in control (e.g., from a first guest application to a second guest application, from a first process running in a VM to a second process running in the VM) without causing a VM exit. Note that these embodiments are not limited to providing this feature; they may also be used in other ways and for other purposes. In one embodiment, a virtualization exception is defined (as further described below); the virtualization exception may be raised by an EPT violation (or other privileged event) and may result in a direct (i.e., not through a VMM) transfer of control within a VM to handle the EPT violation.

The use of the virtualization exception in the embodiment described above may be desired, for example, in the following scenario. A single instance of a VMM (e.g., a special-purpose "thin" VMM that is designed to support a security application) may be installed to run on bare platform hardware. A single instance of an OS may be installed to run as a guest OS in a VM hosted by the VMM. The OS may have multiple components (e.g., different software modules), such as a kernel and a number of drivers. The VMM may provide protections between these components by associating each such component with its own EPT hierarchy, such that each component's portion of memory may not be accessed by the other components. In other words, multiple protected guest address spaces or domains may exist within a single VM. Note that this is just an example embodiment, other embodiments, such as embodiments providing protection between two separate VMs, are possible.

Continuing with this special-purpose, thin VMM embodiment, a software application program (e.g., an anti-malware program or in-band agent ("IBA")), may be installed to run as a guest application in the VM. The anti-malware application may be designed to "know" and to take advantage of the knowledge that it is running in a virtualized environment. Such a situation may be referred to as "para-virtualization" and such software may be referred to as an "enlightened" application.

The anti-malware application may be responsible for making and enforcing (with help from the processor and VMM) policies to protect the OS from malware. For example, the anti-malware application may direct the VMM to set up multiple guest address spaces, with EPTs, to protect various OS components. The anti-malware application may also be responsible, instead of the VMM, for handling and making decisions (such as whether to allow a switch between guest address spaces) regarding EPT violations. Rather than require a VM exit to transfer control from the OS to the VMM and then a VM entry to transfer control from the VMM to the anti-malware application in order to handle EPT violations, embodiments of the present invention provide for control to be passed directly from the OS to the anti-malware application.

In one embodiment of the present invention, the architecture of processor 120 includes a virtualization exception ("#VE"). Any one or more of any number of different privileged events may raise, cause, or otherwise result in a virtualization exception, instead of causing a VM exit. Processor 120 may be designed to be able to recognize each of these privileged events and, upon recognizing such an event, be programmable or configurable to respond with one of a number of options, including a #VE, a VM exit, and doing nothing.

Configurability on a per event basis may be provided by any number of bits, indicators, or fields in a VMCS, arranged as desired. For example, a VMCS may include a #VE event bitmap, with each location of the bitmap corresponding to a different event, where each location may be set or programmed by a VMM to a first value (e.g., '1') to direct the processor to respond to the event with a #VE instead of a responding (e.g., based on a second, default value of '0') with a VM exit. The processor may enumerate (e.g., in a response to a CPUID or RDMSR instruction) to software the set of conditions that may be configured to cause a #VE.

In one embodiment, other data structures may be used to provide finer grained control of virtualization exceptions. For example, a single bit in a #VE event bitmap in a VMCS may provide for enabling #VE in response to EPT violations, and fine-grained controls (e.g., bits within the EPTs) may provide for suppressing or, alternatively, causing a #VE in response to an attempt to access any particular page or group of pages. More specifically, each entry in a page table, a page table directory, or any other structure in an EPT hierarchy may include a bit that may be set to suppress, or alternatively cause, a #VE (e.g., when a global #VE enable bit is also set) upon an attempt to access that page or group of pages, regardless of or based on any logical combination with any other permission bits controlling access to that page or group of pages (e.g., a "not present" bit). Such an embodiment may be desired to cause VM exits on accesses to some protected pages (e.g., those containing VMM code) and #VEs on accesses to other protected pages (e.g., those containing OS data structures).

Execution hardware 124 and/or control logic 126 may refer to any such bits, indicators, or fields in a VMCS to determine how to respond to a privileged event. In one embodiment, a VMCS control bit corresponding to a particular event may be set to a high or logical '1' value to cause processor 120 to respond to the event with a #VE, but any logic convention or nomenclature may be used within the scope of the present invention.

Embodiments of the present invention may provide for more than one #VE, such that a first #VE may be used to respond to a first event or group of events and a second #VE may be used to respond to a second event or group of events.

Furthermore, different #VEs may also be used in connection with finer grained controls; for example, a first #VE may be used to respond to EPT violations of a first protected memory region and a second #VE may be used to respond to EPT violations of a second protected memory region. The enabling and/or use of each such #VE of multiple #VEs may be configurable using any number of VMCS bits for each event, with different values for each #VE, and/or using any number of VMCS bits for each #VE, with different values for each event.

Furthermore, other embodiments of the present invention may include other responses to the detection, by a processor, of privileged events, such as, but not limited to, interrupts.

Processor 120 may deliver a #VE according to the same approach in which it delivers other exceptions. For example, processor 120 may select a descriptor, from an interrupt-descriptor table, based on a vector number that is associated (e.g., by the architectural definition of processor 120) with the #VE.

Since delivery of the #VE replaces and does not include a VM exit, information that might otherwise be communicated from processor 120 to the VMM (e.g., through a VMCS) may be communicated to a #VE handler (which does not have access to the VMCS) according to a different approach. In one embodiment, this information may be pushed, by processor 120, onto a stack. In another embodiment, this information may be stored in a designated area of memory 130 (e.g., a #VE information page), which may be referenced by processor 120 through a pointer in the VMCS and whose address is known and accessible to the #VE handler.

If this information is to be saved into a fixed memory location, embodiments of the present invention may provide a mechanism to ensure that the information is not overwritten by a second #VE before it is read by a handler for a first #VE. In one embodiment, processor 120 may write a sentinel value to a guard location on the #VE information page when delivering a #VE. A #VE handler may be responsible for clearing the guard location during handling of the exception. Processor 120 may be designed to write to the #VE information page and deliver another #VE only if the guard location does not contain the sentinel value and to cause a VM exit instead of a #VE if the guard location does contain the sentinel value.

In one embodiment, to prevent a race condition (e.g., a first virtual processor reads a guard location that does not contain the sentinel value, but before the fast virtual processor writes the sentinel value to the guard location, a second virtual processor reads the same guard location and determines that it does not contain the sentinel value, so the second virtual processor writes over the first virtual processor's data on the #VE information page, or vice versa) a #VE information page may not be shared by two or more virtual processors. In another embodiment, reading the guard location and writing the sentinel value is performed atomically.

FIG. 2 illustrates method 200, a method for using virtualization exceptions according to an embodiment of the present invention. Although method embodiments of the invention are not limited in this respect, reference may be made to elements of FIG. 1 to help describe the method embodiment of FIG. 2. Method 200 may include one or more VM entries using VMLAUNCH and/or VMRESUME instructions, however, embodiments of the present invention are not limited to these specifically named instructions. Method 200 may include some actions performed by software (e.g., a VMM) and other actions performed by hardware. Software and/or hardware may also perform other actions (not shown) in connection with the actions shown. Note that except as indicated, following the VM entry in box 220, method 200 may be performed entirely in non-root mode without a VM exit or other transfer of control to a VMM.

In box 210, a VMM (e.g., a special-purpose security VMM to work with an IBA), operating in root mode on a processor (e.g., processor 120), configures one or more VMCSs, one or more EPTs to establish protection domains, and/or any fine-grained controls to enable or suppress a VE# upon the detection, by the processor, of one or more privileged events. Note that in embodiments including layered virtualization architecture, the VMM may be operating in non-root mode.

In box 220, control of the processor may be transferred from a VMM operating in root mode to a guest OS, operating in a VM, in a first protection domain. In box 222, the guest OS transfers control to a first guest application within the first protection domain. In box 224, the processor detects the occurrence of a privileged event (e.g., an EPT violation) while the first guest application is in control of the processor.

In box 230, the processor (e.g., control logic 126) determines whether it supports #VE for this privileged event. If not, method 200 continues with a VM exit (e.g., for the VMM to handle the EPT violation) in box 290. If so, method 200 continues in box 232.

In box 232, the processor (e.g., control logic 126) determines whether the VMCS has been configured to cause the processor to respond with a #VE for this privileged event. If not, method 200 continues with a VM exit in box 290. If so, method 200 continues in box 234.

In box 234, the processor (e.g., control logic 126) determines whether any fine-grained controls suppress the #VE. If so, method 200 continues with a VM exit in box 290. If not, method 200 continues in box 236.

In box 236, the processor (e.g., control logic 126) determines whether a guard location on a #VE information page contains a sentinel value. If so, method 200 continues with a VM exit in box 290. If not, method 200 continues in box 240.

In box 240, the processor (e.g., control logic 126) writes #VE handling information to the #VE information page. In box 242, the processor (e.g., control logic 126) writes a sentinel value to a guard location on the #VE information page. In box 244, the processor (e.g., control logic 126) generates a #VE directed to a #VE handler (e.g., through an IDT). In one embodiment, the #VE handler may be code of a second guest application, such as an IBA, where the second guest application is to operate in a second protection domain, except for a #VE handler stub within the first protection domain.

In box 246, delivery of the #VE causes control of the processor to be transferred from the first guest application to the #VE handler stub. In box 248, the #VE handler stub executes an instruction to change the EPT hierarchy, causing a switch from the first protection domain to a second protection domain.

In another embodiment, delivery of the #VE may cause a switch from the first protection domain to the second protection domain.

In box 250, the second guest application begins to operate in the second protection domain. In box 252, the second guest application handles the #VE. Handling may include, but is not limited to, any of determining whether to allow the first guest application to access a protected memory page or a privileged resource; determining whether to temporarily or permanently change and/or changing a permission indicator or value; determining whether to make and/or making any policy or policy-based change; and/or determining whether to transfer control to the VMM, the guest OS, a third guest application, or the first guest application (where the transfer may occur after the guard location is reset in box 254). In box 254, the second guest application resets the guard location on the #VE information page.

In various embodiments of the present invention, the method illustrated in FIG. 2 may be performed in a different order, with illustrated boxes combined or omitted, with additional boxes added, or with a combination of reordered, combined, omitted, or additional boxes. For example, box 222 may be omitted (or may occur followed by a transfer of control from the first guest application back to the guest OS), such that the privileged event of box 224 occurs while the guest OS is in control of the processor.

Furthermore, method embodiments of the present invention are not limited to method 200 or variations thereof. Many other method embodiments (as well as apparatus, system, and other embodiments) not described herein are possible within the scope of the present invention.

Embodiments or portions of embodiments of the present invention, as described above, may be stored on any form of a machine-readable medium. For example, all or part of method 200 may be embodied in software or firmware instructions that are stored on a medium readable by processor 120, which when executed by processor 120, cause processor 120 to execute an embodiment of the present invention. Also, aspects of the present invention may be embodied in data stored on a machine-readable medium, where the data represents a design or other information usable to fabricate all or part of processor 120.

Thus, embodiments of an invention for virtualization exceptions have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
   instruction hardware to receive a plurality of instructions, including an instruction to enter a virtual machine;
   control logic to determine, in response to a first exception occurring within the virtual machine operating according to a first configuration of a virtual machine control structure, to cause an exit from the virtual machine to a virtual machine monitor outside the virtual machine, and to determine, in response to the first exception occuring within the virtual machine operating according to a second configuration of the virtual machine control structure, to generate a second exception instead of an exit from the virtual machine; and
   execution hardware to generate the second exception in response to the control logic determining to generate the second exception and to respond to the second exception with a transfer of execution control within the virtual machine.

2. The processor of claim 1, wherein the control logic is to determine whether to generate the second exception based, at least in part, on one or more fine-grained controls.

3. The processor of claim 2, wherein the one or more fine-grained controls include one or more controls in one or more of an extended page table and an extended page table directory.

4. The processor of claim 1, wherein in response to the control logic determining to generate the second exception, the execution hardware is also to select a descriptor, from an interrupt-descriptor table, based on a vector number associated with the second exception.

5. The processor of claim 1, wherein in response to the control logic determining to generate the second exception, the execution hardware is also to save virtualization exception handling information.

6. A system comprising:
   a memory in which to store a virtual machine control structure; and
   a processor including
      instruction hardware to receive a plurality of instructions, including an instruction to enter a virtual machine;
      control logic to determine, in response to a first exception occurring within the virtual machine operating according to a first configuration of the virtual machine control structure, to cause an exit from the virtual machine to a virtual machine monitor outside the virtual machine, and to determine, in response to the first exception occuring within the virtual machine operating according to a second configuration of the virtual machine control structure, to generate a second exception instead of an exit from the virtual machine; and
      execution hardware to generate the second exception in response to the control logic determining to generate the second exception and to respond to the second exception with a transfer of execution control within the virtual machine.

* * * * *